United States Patent
Miyamoto (10) Patent No.: US 9,992,378 B1
(45) Date of Patent: Jun. 5, 2018

(54) IMAGE FORMING SYSTEM WITH EXTERNAL APPARATUS, IMAGE FORMING APPARATUS AND PROJECTOR

(71) Applicant: KYOCERA Document Solutions Inc., Osaka (JP)

(72) Inventor: Keita Miyamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days. days.

(21) Appl. No.: 15/820,078

(22) Filed: Nov. 21, 2017

(30) Foreign Application Priority Data

Nov. 21, 2016 (JP) .................................. 2016-225798

(51) Int. Cl.
*H04N 1/44* (2006.01)
*H04N 1/00* (2006.01)

(52) U.S. Cl.
CPC ....... *H04N 1/4453* (2013.01); *H04N 1/00267* (2013.01); *H04N 1/00376* (2013.01); *H04N 1/00968* (2013.01); *H04N 2201/0013* (2013.01); *H04N 2201/0094* (2013.01)

(58) Field of Classification Search
CPC .... H04N 1/44; H04N 1/4493; H04N 1/00275; H04N 1/00968
USPC ........ 358/1.18, 3.28, 509, 450, 464; 726/27; 353/28, 30
See application file for complete search history.

(56) References Cited

U.S. PATENT DOCUMENTS

| 6,984,045 B2* | 1/2006 | Cambron | G03B 21/26 348/E5.137 |
| 2009/0086173 A1* | 4/2009 | Combs | G03B 21/134 353/122 |
| 2013/0169677 A1* | 7/2013 | Rosset | B41M 3/148 345/629 |

FOREIGN PATENT DOCUMENTS

| JP | 2003-500714 A | 1/2003 |
| JP | 2006-510329 A | 3/2006 |
| WO | WO2000072505 A | 11/2000 |
| WO | WO2004051917 A | 6/2004 |

* cited by examiner

*Primary Examiner* — Jamares Q Washington
(74) *Attorney, Agent, or Firm* — Hawaii Patent Services; Nathaniel K. Fedde; Kenton N. Fedde (57) ABSTRACT

Provided is an image forming system that simply and securely protects printed matter that is not so important, but that the user does not wish others to view. An external apparatus receives a simple-security setting for image data for which there is a printing instruction, includes the simple-security setting in the printing instruction, and transmits the printing instruction to an image forming apparatus. The image forming apparatus, when a simple-security setting is included, adds a mark image to the image data for which there is a printing instruction, and prints the image data. A projector, by an imaging unit, captures an image of the discharge tray, and when a mark image is detected, generates a projection image on which a security image is arranged, and projects the projection image toward the discharge tray.

7 Claims, 13 Drawing Sheets

IMAGE FORMING SYSTEM WITH EXTERNAL APPARATUS, IMAGE FORMING APPARATUS AND PROJECTOR

INCORPORATION BY REFERENCE

This application is based on and claims the benefit of priority from Japanese Patent Application No. 2016-225798 filed on Nov. 21, 2016, the contents of which are hereby incorporated by reference.

BACKGROUND

The present disclosure is related to an image forming system with an external apparatus, an image forming apparatus and a projector.

Conventionally, in a workplace, sharing an image forming apparatus such as a copier, MFP and the like among people is typical. Therefore, security measures by the image forming apparatus become necessary, and for example, technology that detects copied material by embedding and printing a digital watermark is known. Moreover, when an instruction is given from an external apparatus for printing image data, printed material that is printed by an image forming apparatus is often left until the user that gave the printing instruction comes to retrieve the printed material. In this case, this is okay when viewing of the outputted printed material by other people poses no problem, however, there are cases when viewing of the outputted printed material by other people would pose a problem from a security aspect. Therefore, there is known technology that requests key authentication at the time of output from the image forming apparatus, and only a user that is successful in that key authentication is able to obtain the output.

SUMMARY

The image forming system according to the present disclosure includes an external apparatus, an image forming apparatus, and a projector. The external apparatus gives a printing instruction for printing image data. The image forming apparatus has a printing unit that prints based on the image data for which there is the printing instruction by the external apparatus. The external apparatus includes a simple-security-setting-receiving unit, and a printing-instruction-transmitting unit. The simple-security-setting-receiving unit receives a simple-security setting for the image data for which there is the printing instruction. The printing-instruction-transmitting unit includes the simple-security setting that is received by the simple-security-setting-receiving unit in the printing instruction, and transmits the printing instruction to the image forming apparatus. The image forming apparatus includes a simple-security-determining unit, a mark-adding unit, and a discharge tray. The simple-security-determining unit determines whether or not the simple-security setting is included in the printing instruction that is transmitted by the printing-instruction-transmitting unit. The mark-adding unit, when the simple-security setting is included, adds a mark image to the image data for which there is the printing instruction. Printed matter that is printed by the printing unit is discharged to the discharge tray with the surface on which the mark image is printed facing upward. The projector includes an imaging unit, a mark-detecting unit, a projection-image-generating unit, and an image-projecting unit. The imaging unit captures an image of printed matter that is discharged to the discharge tray. The mark-detecting unit detects the mark image from the captured image that is captured by the imaging unit. The projection-image-generating unit, when the mark image is detected by the mark-detecting unit, generates a projection image on which a specified security image is arranged. The image-projecting unit projects the projection image that is generated by the projection-image-generating unit toward the discharge tray.

DETAILED DESCRIPTION

In the following, an embodiment according to the present disclosure will be explained in detail with reference to the drawings. In the embodiment described below, the same reference numbers will be used for configuration illustrating the same function.

Figure 1:
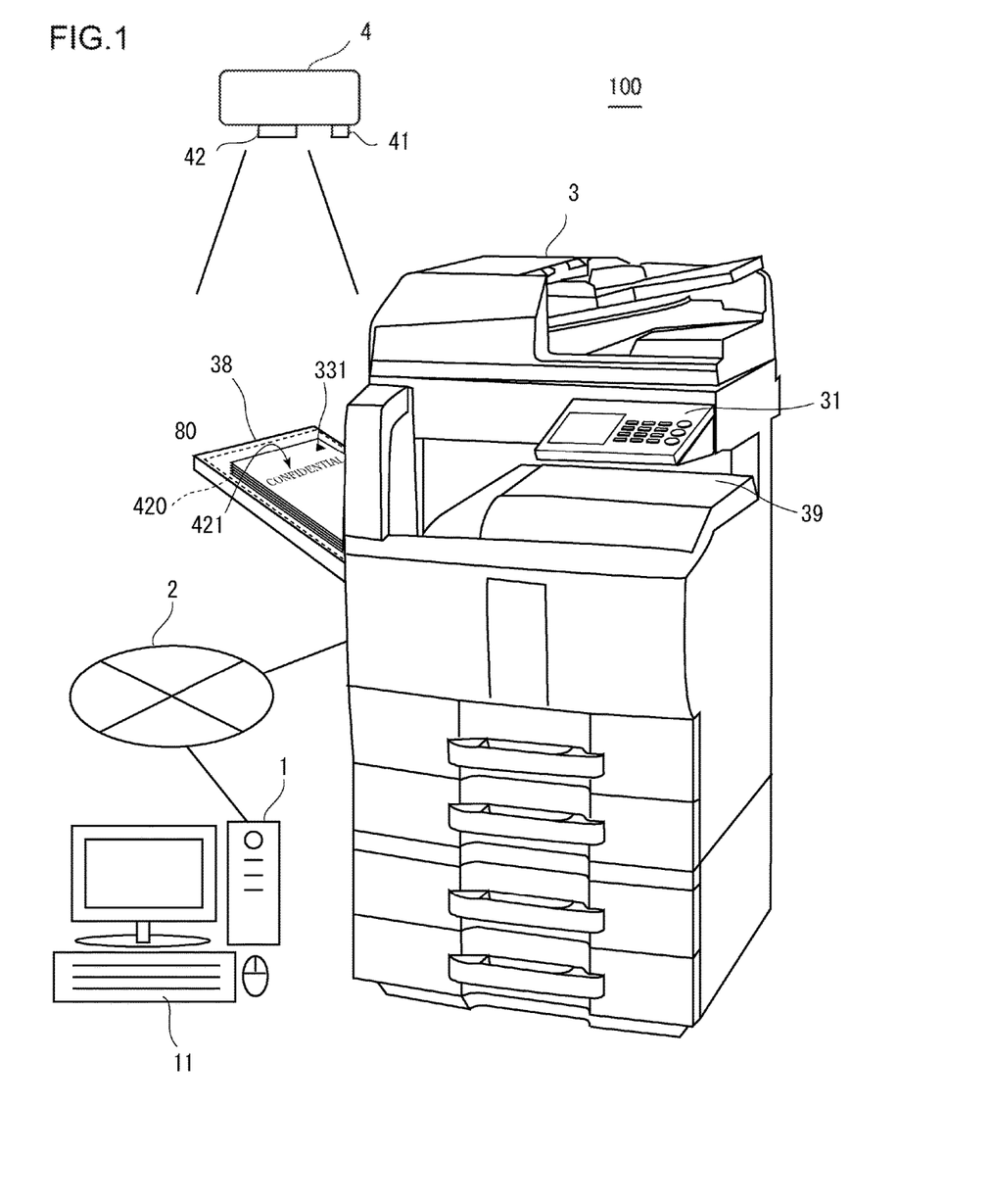
FIG. 1 is a system configuration diagram of an image forming system according to an embodiment of the present disclosure.

The image forming system 100 according to this embodiment, as illustrated in FIG. 1, includes an external apparatus 1 that gives an instruction for printing image data, an image forming apparatus 3 that prints image data for which there is a printing instruction from the external apparatus 1, and a projector 4 that projects an image. The external apparatus 1 is a user terminal, and is an information processing apparatus such as a personal computer, a smartphone, a tablet terminal and the like. The image forming apparatus 3 is an apparatus such as a printer, copier, MFP and the like that has a printing function, and is connected to one or more external apparatus via a network 2. The projector 4 is an image projecting apparatus that projects an projection image 420 in which a security image 421 is arranged on printed matter 80 that is to be outputted to the discharge tray 38 of the image forming apparatus 3.

Figure 2:
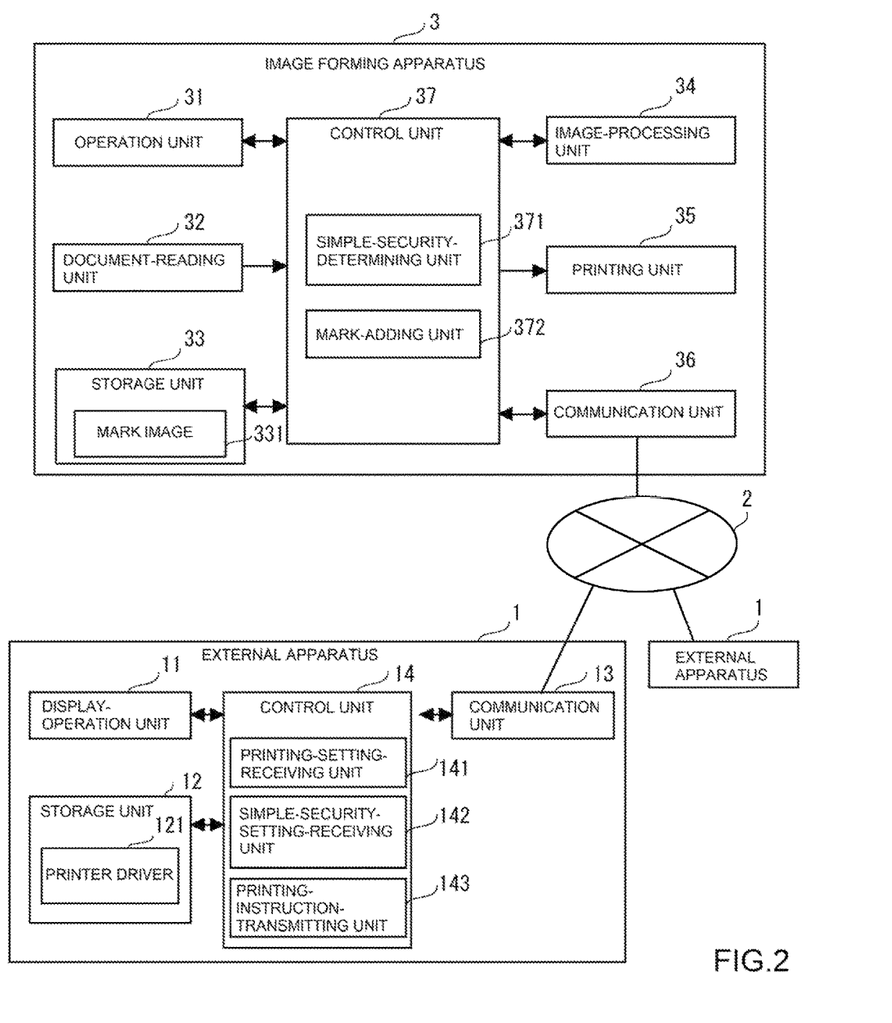
FIG. 2 is a functional block diagram illustrating control configuration of the external apparatus and image forming apparatus illustrated in FIG. 1.

Referencing FIG. 2, the external apparatus 1 includes a display operation unit 11, a storage unit 12, a communication unit 13 and a control unit 14.

The display operation unit 11 is a user interface that includes a display unit such as a liquid-crystal display or the like that displays various information, and an input unit such as a keyboard, mouse or the like. The display unit may also be a touch panel that is provided with a transparent pressure-sensitive sensor on the surface of the display panel and that functions as a display unit and input unit.

The storage unit 12 is a storage unit such as a semiconductor memory, HDD (Hard Disk Drive) or the like, and stores a printer driver 121. The printer driver 121 is an application program for giving an instruction to the image forming apparatus 3 to print image data, and is installed in the external apparatus 1. A user is able to download the printer driver 121 from the Internet or the like via the communication unit 13, and install that printer driver 121 in the external apparatus 1. Moreover, the storage unit 12 stores image data.

The communication unit 13 is connected to a network 2, and has a function for transmitting and receiving various data to and from the image forming apparatus 3 by wireless LAN (Local Area Network) communication, wired LAN communication and like.

The control unit 14 is connected to the display-operation unit 11, the storage unit 12, and the communication unit 13 respectively, and executes control of the overall operation of the external apparatus 1. The control unit 14 is an information-processing unit such as a microcomputer or the like and includes a CPU (Central Processing Unit), a ROM (Read Only Memory), a RAM (Random Access Memory) and the like. The ROM stores a control program for performing operation control of the external apparatus 1. The CPU of the control unit 14 reads a control program that is stored in ROM, and by expanding the control program in RAM, performs overall control of the apparatus. Moreover, the control unit 14 reads the printer driver 121 that is stored in the storage unit 12, expands that printer driver 121 in RAM, and activates the printer driver 121. As a result, the control unit 14 functions as a printing-setting-receiving unit 141 that realizes the function of the printer driver 121, a simple-security-setting-receiving unit 142, and a printing-instruction-transmitting unit 143.

The printing-setting-receiving unit 141 has a function of receiving printing settings such as the number of sheets to be printed, the paper size, double-sided printing and the like when there is an instruction via the display-operation unit 11 to print image data. The user may instruct printing of image data that is stored in the storage unit 12 of the external apparatus 1 via the display-operation unit 11, and may also instruct printing of image data that is stored in the storage unit 33 of the image forming apparatus 3 via the communication unit 13.

The simple security-setting-receiving unit 142 has the function of receiving simple security settings for image data for which printing is instructed. The simple security settings are not enough for strictly managing security, however are for printing documents and the like for which viewing by other people is not desired. When simple security settings are performed, when image data is printed by the image forming apparatus 3, the projector 4 projects a security image 421 on the printed matter 80 indicating that the document is a confidential document. Therefore, by the security image 421 it is clear that the printed matter 80 is a confidential document, so it is possible to prevent users other than the user that instructed printing from viewing the printed matter 80.

Figure 3:
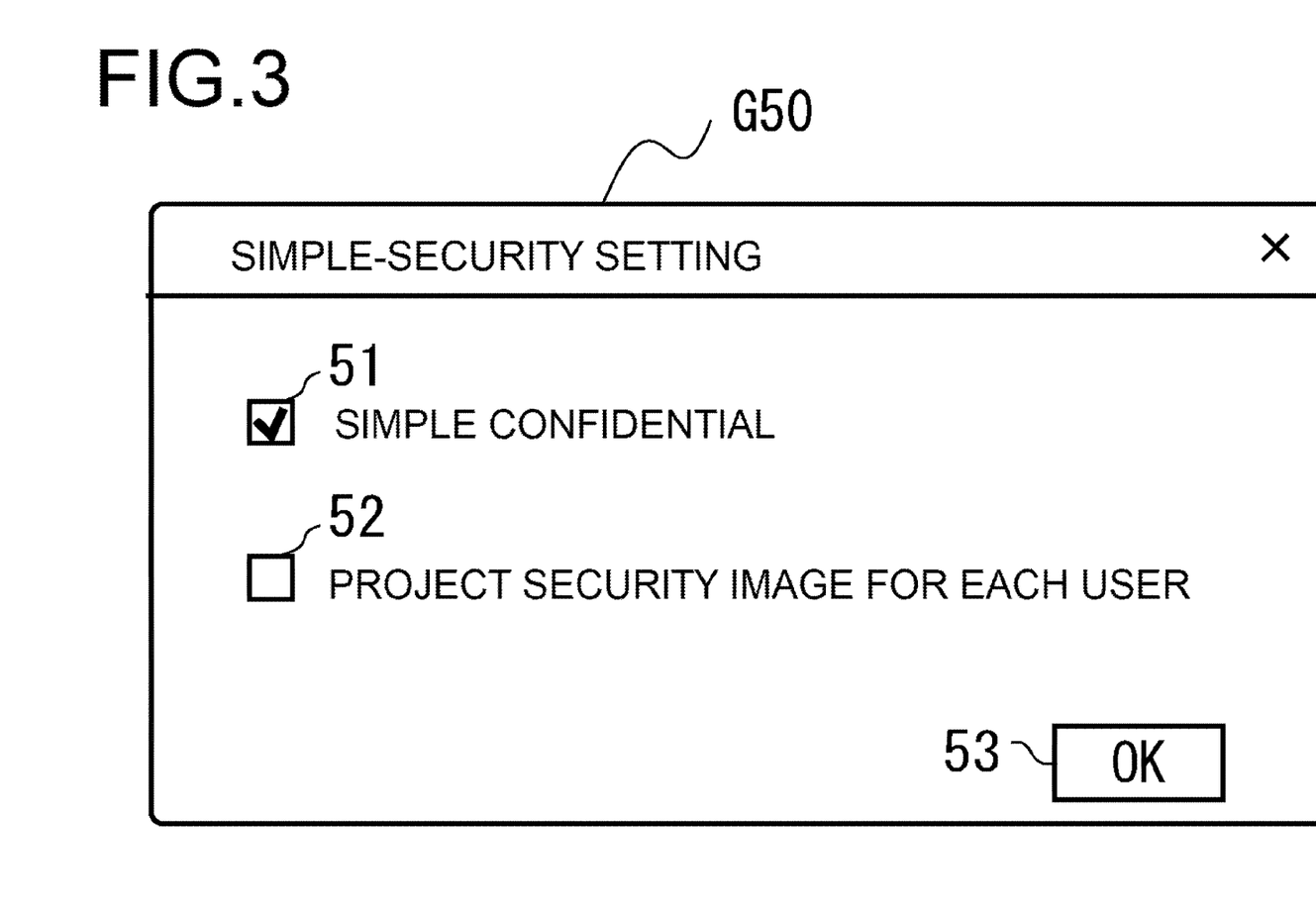
FIG. 3 is an example of a simple security setting screen that is displayed on the display operation unit illustrated in FIG. 2.

FIG. 3 illustrates an example of the display of a simple-security-setting screen G50 that receives a simple-security setting. The simple-security-setting screen G50 is provided with a check box 51 that instructs simple CONFIDENTIAL, a check box 52 that instructs projecting a security image 421 for each user, and an OK button 53. Each item of the simple-security-setting screen G50 may be provided inside the printing-setting screen for receiving printing settings by the printing-setting-receiving unit 141, or may be provided separately from the printing-setting screen.

When enabling the simple-security setting, the user enters a check in the check box 51. The user can also correlate an arbitrary image as the security image 421 and a projection color beforehand with the user information, and register that information in the projector 4 via the Internet or the like. When a check is entered in the check box 52, it is possible to project a registered security image 421 corresponding to a user on the printing matter 80 instead of the default security image 421. When the OK button 53 is clicked in a state in which a check is entered in the check box 51, the simple-security-setting-receiving unit 142 receives the simple-security setting for image data for which there is a printing instruction. The discharge destination for printed matter 80 when a simple-security setting is received is automatically set to be the discharge tray 38.

The printing-instruction-transmitting unit 143 has the function of transmitting printing settings that are received by the printing-setting-receiving unit, and the simple-security setting that is received by the simple-security-setting-receiving unit 142 together with image data for which there is a printing instruction to the image forming apparatus 3 via the communication unit 13 as a printing instruction.

The image forming apparatus 3 includes an operation unit 31, a document-reading unit 32, a storage unit 33, an image-processing unit 34, a printing unit 35, a communication unit 36 and a control unit 37.

The operation unit 31 includes a touch panel and operation buttons. The touch panel is provided with a transparent pressure-sensitive sensor on the surface of the display unit that displays various operation keys and the image forming state, and functions as a display unit and an input unit. The touch panel detects a touch operation on the display screen, and by outputting a signal that corresponds to the position where the touch operation is detected, receives the operation of the operation key that is displayed on the display unit. Moreover, the operation buttons include various operation keys such as a numeric keypad for inputting numerical values such as the number of sheets to be printed and the like, a reset key for inputting an instruction to initialize the setting information, a stop key for stopping a copy operation, a start key for inputting an output instruction for starting a printing operation, and the like.

The document-reading unit 32 is a scanner that reads a document image by irradiating light onto a document that is supplied by a document feeder, or a document that is placed on the platen glass by a user, and receiving the reflected light or the like.

The storage unit 33 is a storage unit such as a semiconductor memory, HDD or the like, and stores image data that is read by the document-reading unit 32 or image data that is received from the external apparatus 1 via the communication unit 36. Moreover, the storage unit 33 stores mark images 331. Plural mark images 331 are stored and include a mark (for example, filled triangle) for instructing projection of the default security image 421, or different marks (for example, circle, open triangle, square, and the like) for each user that instruct projection of security images 421 according to the user.

The image-processing unit 34 is a processing unit that performs specified image processing on image data. The image-processing unit 34, for example, performs enlargement or reduction processing, or image improvement processing such as density adjustment, tone adjustment and the like.

The printing unit 35 is a printing unit that prints image data that is stored in the storage unit 33. The printing unit 35, for example, forms a latent image on the surface of a photosensitive drum based on image data that is read from the storage unit 33, and performs image formation by using toner to form a toner image of the latent image, then transfers the toner image from the photosensitive drum to printing paper, fixes the toner image to the printing paper, and discharges the paper. Moreover, the printing unit 35 includes a double-sided printing function. When performing double-sided printing, the printing unit 35, after printing on one side of the printing paper, without discharging the paper, quickly turns over the printing paper from front to back by conveying the printing paper on a paper inversion conveying path, then performs printing on the opposite surface from the surface that was previously printed, and discharges the printing paper for which printing has been performed on both sides.

The printing paper on which printing is performed is discharged from either a discharge tray 38 that is formed so as to protrude from the side surface of the image forming apparatus 3, or an inner tray 39 that is formed inside the image forming apparatus 3. When printing based on image data for which the simple security setting is set, the printing paper is discharged from the discharge tray 38.

The communication unit 36 is connected to the network 2, and has the function of transmitting and receiving various kinds of data to and from the external apparatus 1 via wired cables such as LAN cable and the like. In addition the communication unit 36 has the function of transmitting and receiving various kinds of data to and from the external apparatus 1 via wireless communication such as wireless LAN and the like, and connecting to the Internet and the like.

The control unit 37 is connected to the operation unit 31, the document-reading unit 32, the storage unit 33, the image-processing unit 34, the printing unit 35, and the communication unit 36, respectively. The control unit 37 is an information-processing unit such as a microcomputer and the like that includes a CPU, a ROM, a RAM and the like. The ROM stores a control program for performing operation control of the image forming apparatus 3. The control unit 37 performs overall control of the apparatus by reading the control program that is stored in ROM, and expanding the control program in RAM. Moreover, the control unit 37 functions as a simple-security-determining unit 371 and a mark-adding unit 372.

The simple-security-determining unit 371 has the function of determining whether or not a simple-security setting is included in a printing instruction for printing image data that is received from the external apparatus 1 via the communication unit 36.

The mark-adding unit 372 has the function of acquiring a mark image 331 from the storage unit 33 that instructs projection of a security image 421 (default or according to user) that is set on the simple-security-setting screen G50 based on the simple-security setting, and adding that mark image 331 to the image data. This is in the case that the simple-security-determining unit 371 determines that a simple-security setting is included. When the printing unit 35 prints image data to which a mark image 331 is added by the mark-adding unit 372, the printed matter 80 is outputted to the discharge tray 38 with the surface on which the mark image 331 is printed facing upward (projector 4 side).

Figure 4:
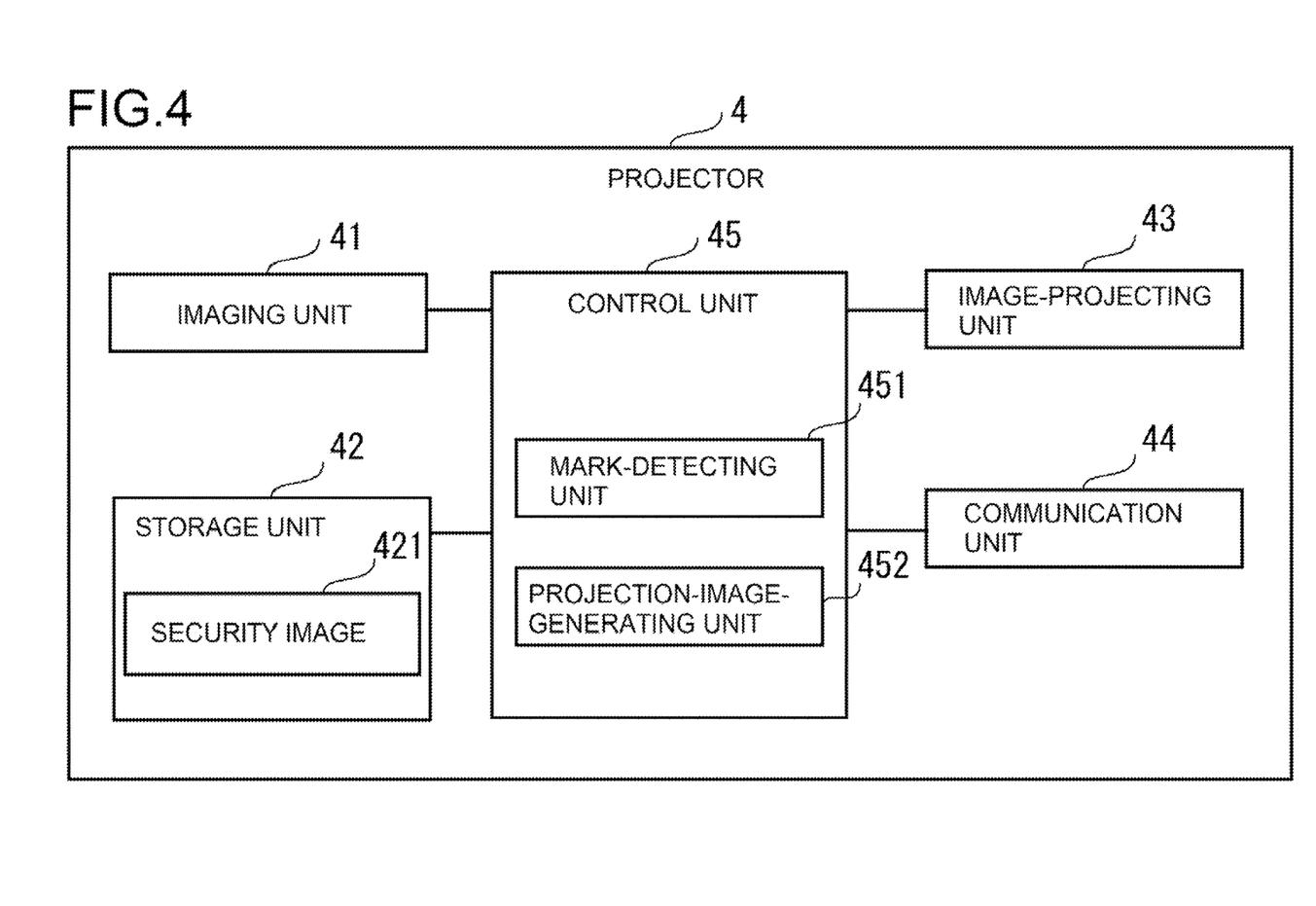
FIG. 4 is a functional block diagram illustrating control configuration of the projector illustrated in FIG. 1.

Next, referring to FIG. 4, the projector 4 is an image projecting apparatus that is capable of projecting a full-color image, and includes an imaging unit 41, a storage unit 42, an image-projecting unit 43, a communication unit 44, and a control unit 45.

The imaging unit 41 is a camera that includes a solid-state imaging element such as a CCD camera, CMOS camera and the like. The imaging unit 41 faces in an imaging direction toward the placement surface of the discharge tray 38, and takes an image of the printed matter 80 that is discharged to the discharge tray 38.

The storage unit 42 is a storage unit such as a semiconductor memory, HDD or the like, and stores security images 421. The security images 421, besides the default security image 421 that is stored beforehand, include security images 421 that are stored according to user, and these security images 421 are correlated with the respective mark images 331.

The image-projecting unit 43 has a color filter, a liquid-crystal panel, a projection lens and the like, and has the function of projecting a projection image 420 that is generated by a projection-image-generating unit 452 (described later) toward the placement surface of the discharge tray 38.

The communication unit 44 has the function of connecting to the Internet by wireless communication such as wireless LAN or the like.

The control unit 45 is connected to the imaging unit 41, the storage unit 42, the image-projecting unit 43 and the communication unit 44, respectively. The control unit 45 is an information-processing unit such as a microcomputer that includes a CPU, a ROM, a RAM and the like. The ROM stores a control program for performing operation control of the projector 4. The control unit 45 performs overall control of the apparatus by reading the control program that is stored in ROM and expanding that control program in RAM. Moreover, the control unit 45 functions as a mark-detecting unit 451 and a projection-image-generating unit 452.

The mark-detecting unit 451 has the function of detecting from a captured image that is captured by the imaging unit 41 a mark image 331 that is added by the mark-adding unit 372. For example, the storage unit 42 may store a mark image for comparison, and the mark-detecting unit 451 is able to detect the mark image 331 using known technology such as pattern matching or the like based on the mark image for comparison from the captured image.

The projection-image-generating unit 452, when a mark image 331 is detected by the mark-detecting unit 451, acquires a security image 421 that corresponds to the mark image 331 from the storage unit 42. Then, the projection-image-generating unit 452 has the function of generating a projection image 420 on which the acquired security image 421 is arranged, and projecting the captured image 420 toward the discharge tray 38 by the image-projecting unit 43.

Figure 5:
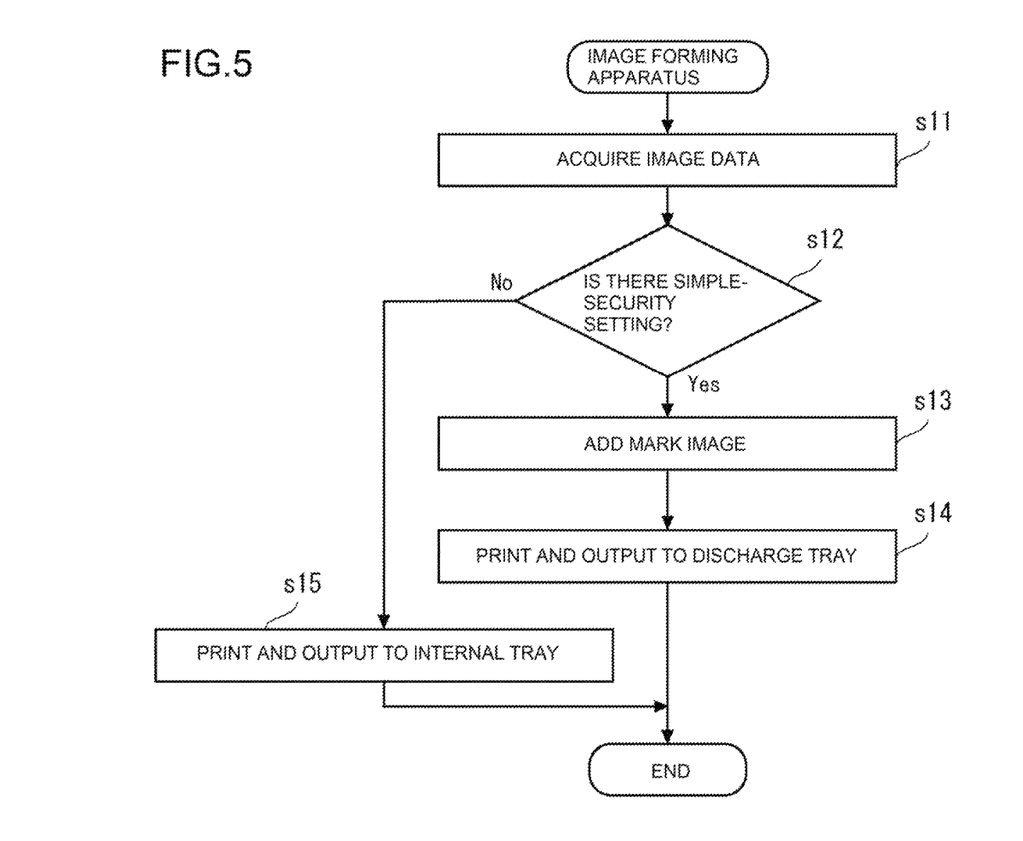
FIG. 5 is a flowchart illustrating the flow of an image forming process of the image forming apparatus illustrated in FIG. 2.

Next, the image forming operation by the image forming apparatus 3 above-described will be explained with reference to FIG. 5.

When the communication unit 36 of the image forming apparatus 3 receives a printing instruction for printing image data from an external apparatus 1 (step s11), the simple-security-determining unit 371 determines whether or not simple security is set based on the printing instruction for printing image data (step s12).

When simple security is set (step s12: YES), the mark-adding unit 372 adds a mark image 331 that corresponds to the type of security image (default or according to user) that is set on the simple-security-setting screen G50 to the image data (step s13).

Next, the printing unit 35 prints the image data to which the mark image 331 is added, and outputs the printed matter 80 to the discharge tray 38 with the surface on which the mark image 331 is printed facing upward (step s14), and processing ends.

On the other hand, when simple security is not set (step s12: NO), the printing unit 35 prints image data with no mark image 331, and outputs the printed matter 80 to the internal tray 39 (step s15), and processing ends.

Figure 6:
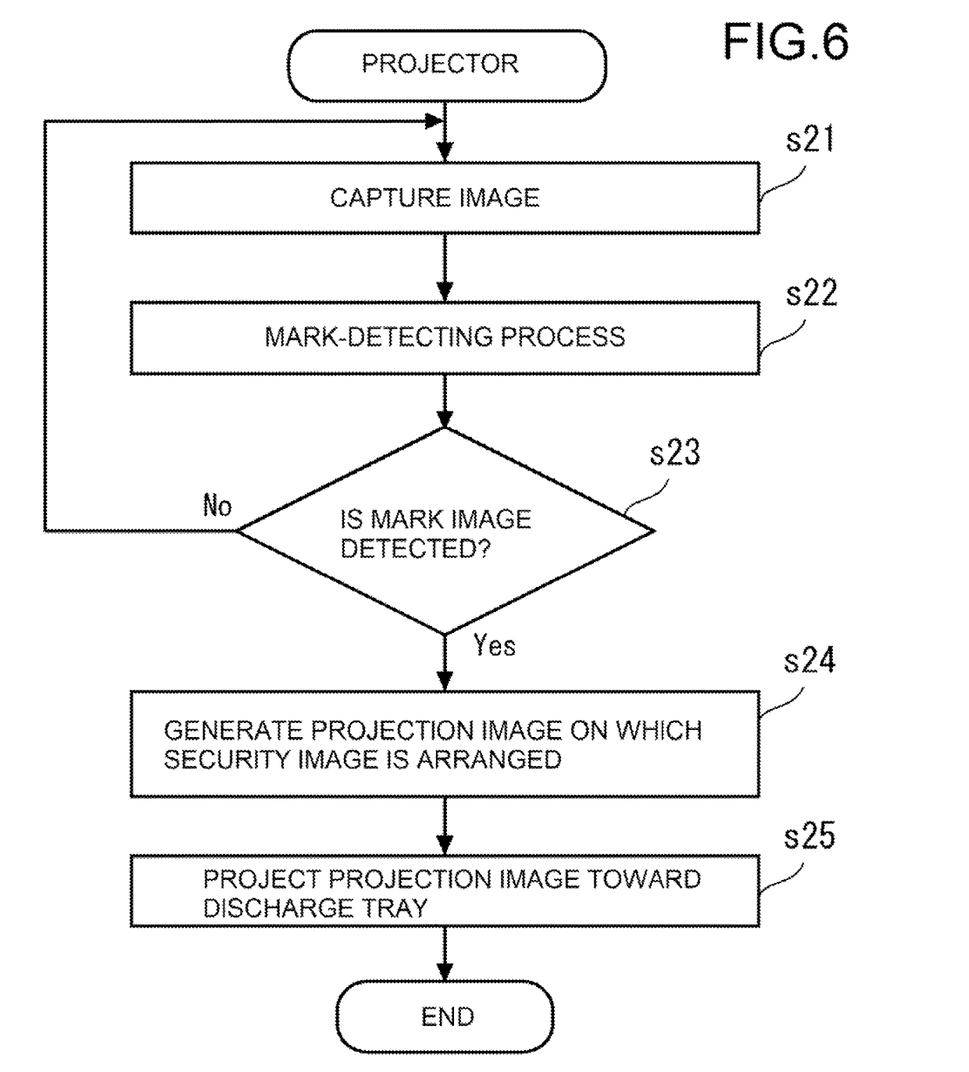
FIG. 6 is a flowchart illustrating the flow of an image projecting process of the projector illustrated in FIG. 4.

Next, the image-projection operation of the projector 4 will be explained with reference to FIG. 6.

The imaging unit 41 of the projector 4 captures an image of the placement surface of the discharge tray 38 (step s21). Then, the mark-detecting unit 451 executes a mark-detecting process to detect the mark image 331 from the image captured by the imaging unit 41 (step s22). When there is no printed matter 80 outputted to the discharge tray 38, or when printed matter 80 on which a mark image 331 is printed is not discharged, the mark-detecting unit 451 does not detect a mark image 331 (step s23: NO), and returns to the processing in step s21.

When printed matter 80 on which a mark image 331 is printed is discharged to the discharge tray 38, the mark-detecting unit 451 detects the mark image 331 from the captured image (step s23: YES). In this case, the projection-image-generating unit 452 generates a projection image 420 on which a security image 421 that corresponds to the detected mark image 331 is arranged (step s24). Continuing, the projection-image-generating unit 452 projects the generated projection image 420 toward the discharge tray 38 by the image-projecting unit 43 (step s25), and this process ends.

Figure 7:
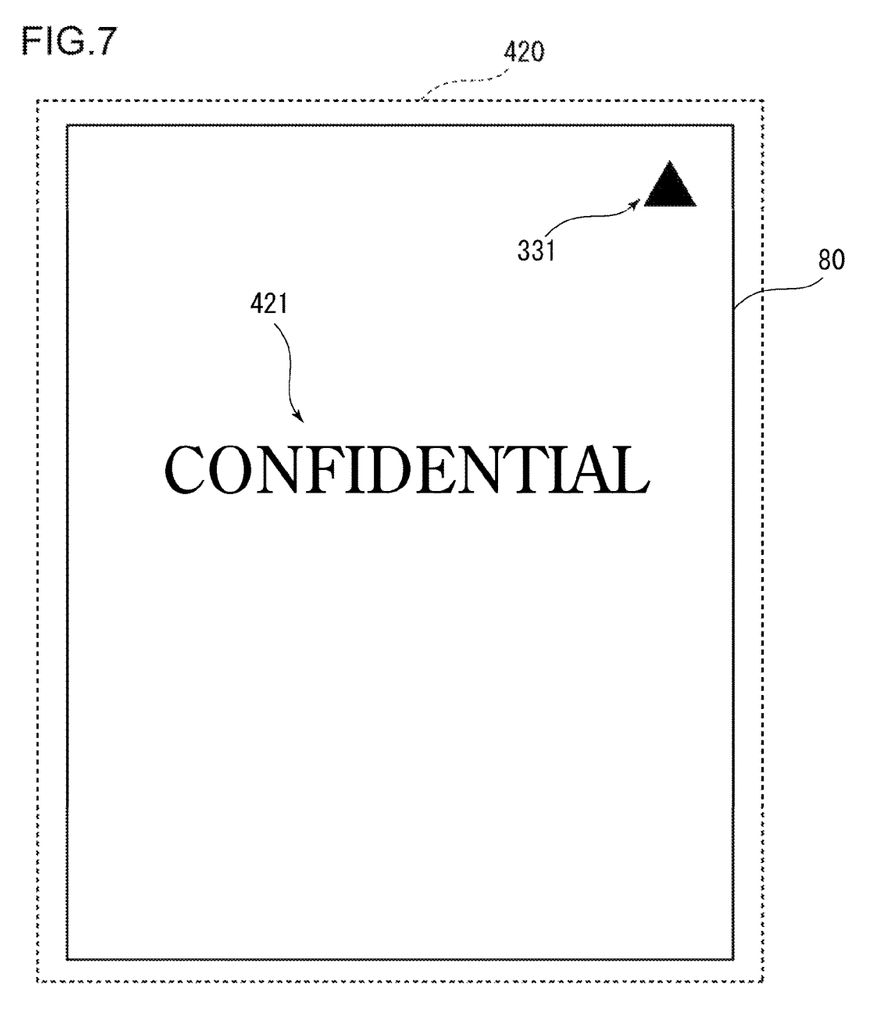
FIG. 7 is an image diagram illustrating a state in which a security image is projected on printed matter.

As a result, as illustrated in FIG. 7, for example, when the mark-detecting unit 451 detects a "filled triangle" mark image 331 from the printed matter 80, the projection-image-generating unit 452 acquires "CONFIDENTIAL" from the storage unit 42 as the security image 421 that corresponds to the "filled triangle" mark image 331. Then, the projection-image-generating unit 452 generates a projection image 420 on which the security image 421 is arranged, and the projection image 420 is projected toward the discharge tray 38 by the image-projecting unit 43. As a result, the projection image 420 overlaps the printed matter 80 that is outputted to the discharge tray 38, and the security image 421 "CONFIDENTIAL" is projected on the printed 80. Therefore, it is clear at first glance that the printed matter 80 is a confidential document, and it is possible to prevent other users from viewing the printed matter 80. In FIG. 7, the projection image 420 is projected at a size that covers the printed matter 80, however, the projection image 420 may be suitably adjusted to correspond to the size of the security image 421.

Figure 8A:
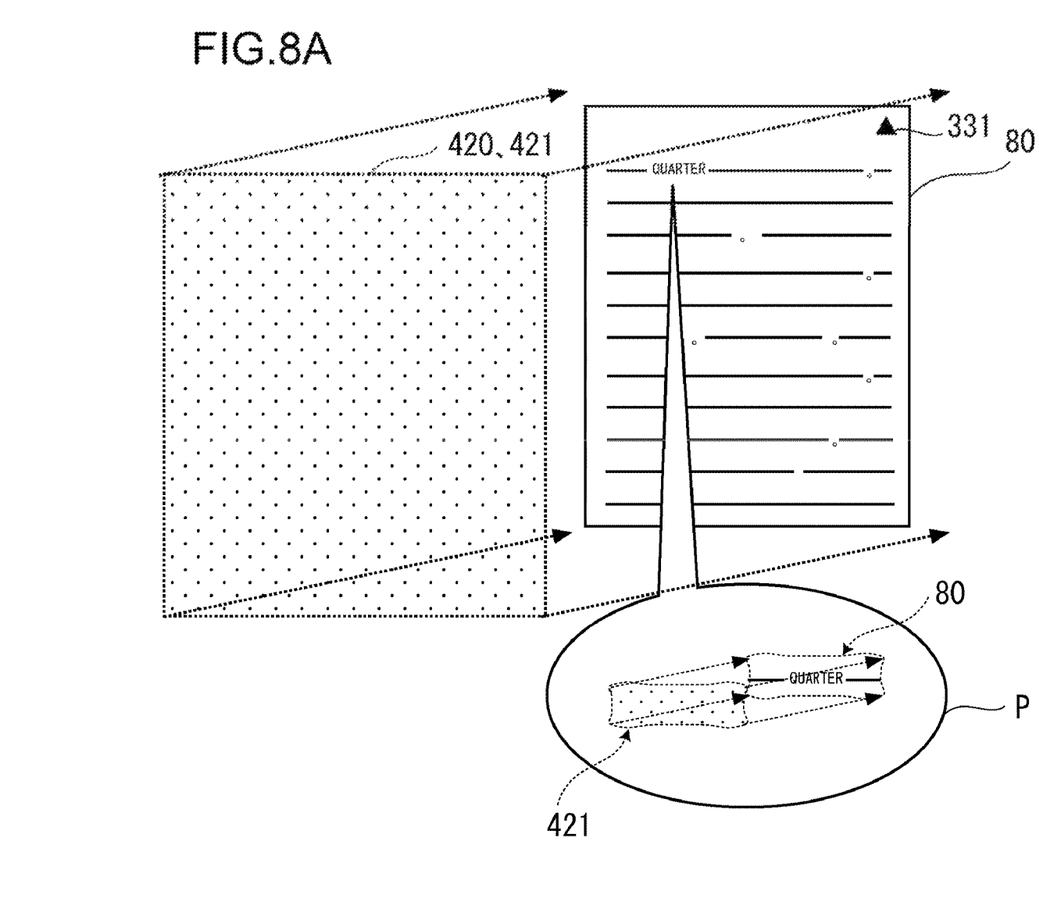
FIG. 8A is an image diagram illustrating a state in which a security image is projected on printed matter.
Figure 8B:
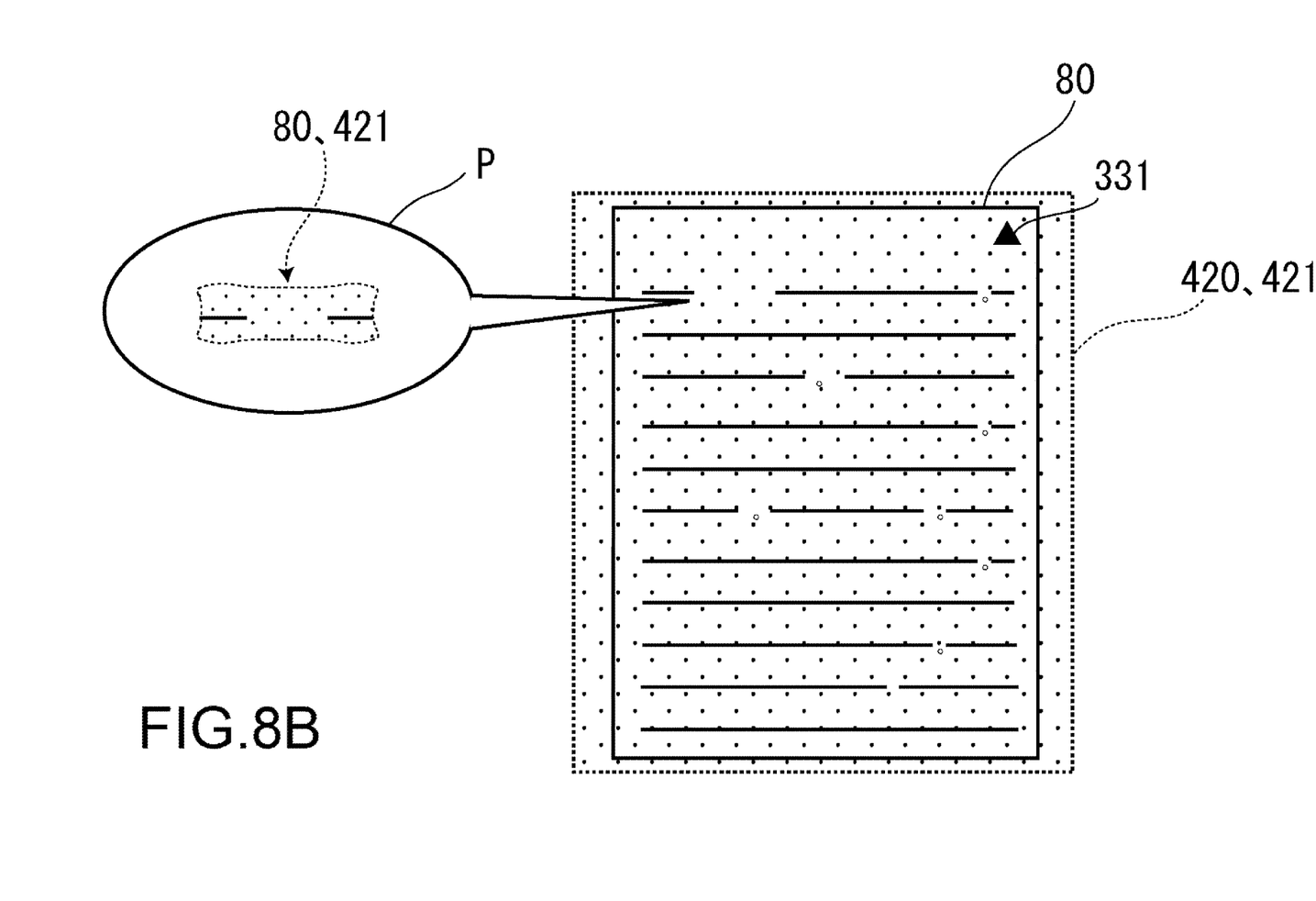
FIG. 8B is an image diagram illustrating a state in which a security image is projected on printed matter.

Moreover, as illustrated in FIG. 8A and FIG. 8B, the security image 421 may be an image that is entirely composed of the same color as a specified color in which confidential matter is written. In this case, when creating a document beforehand, the user writes the text of confidential matter in the specified color (for example, red or the like) that is the same color as the security image 421 and writes text that is not confidential matter in a normal color such as black, then instructs printing of the document in a state in which simple security is set. When printed matter 80 is discharged to the discharge tray 38, the projection-image-generating unit 452 generates a projection image 420 on which a red security image 421 is arranged over the entire surface to correspond to the mark image 331, and the image-projecting unit 43 projects the projection image 420 toward the discharge tray 38. As a result, for example, when "Quarter" that is illustrated in the enlarged view P of FIG. 8A is confidential matter and is in red characters, by overlapping the red security image 421, "Quarter" appears to have disappeared as illustrated in FIG. 8B. Therefore, even when other users that are passing by glance at the printed matter 80, it is not possible to read the confidential matter.

Figure 9A:
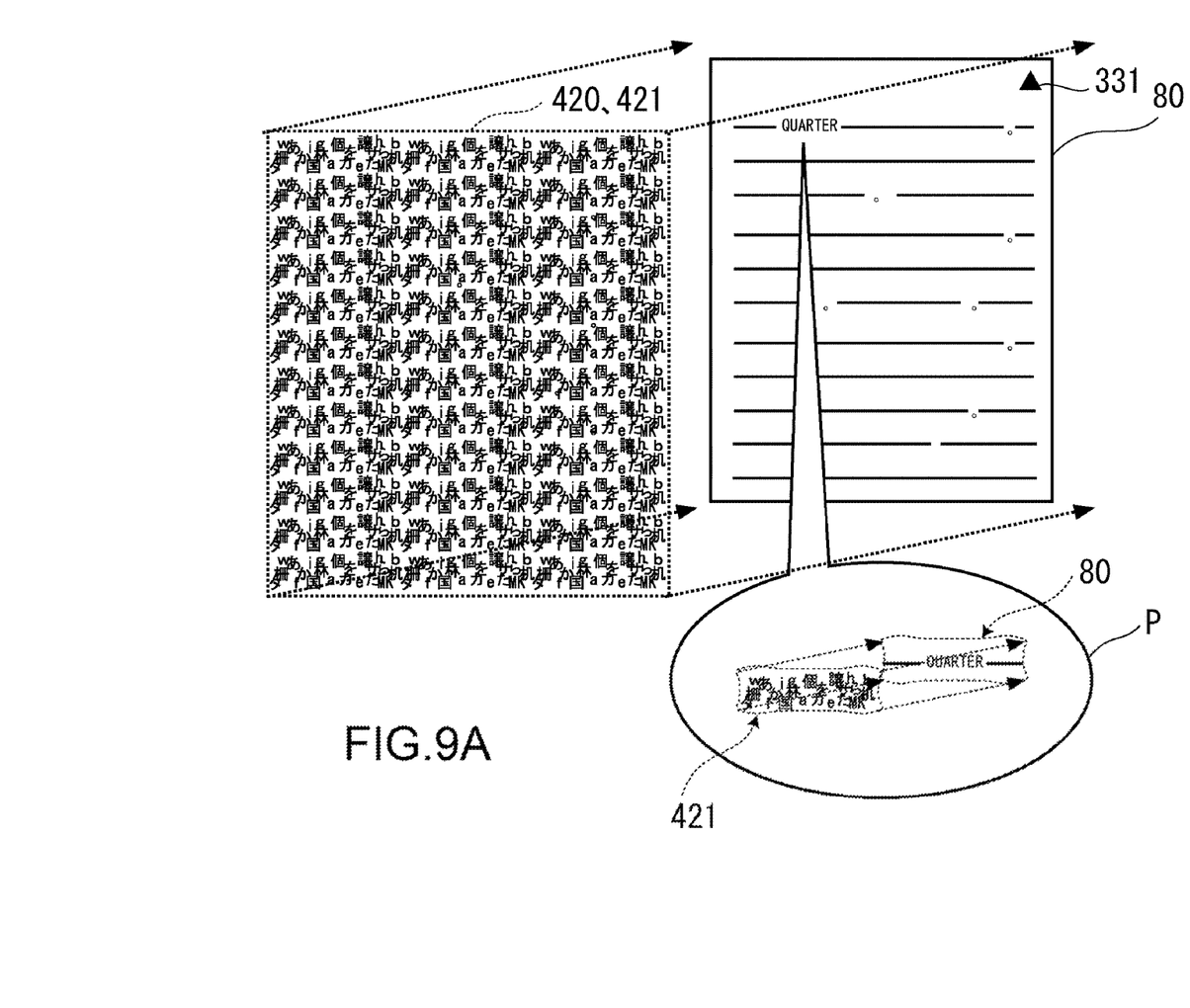
FIG. 9A is an image diagram illustrating a state in which a security image is projected on printed matter.
Figure 9B:
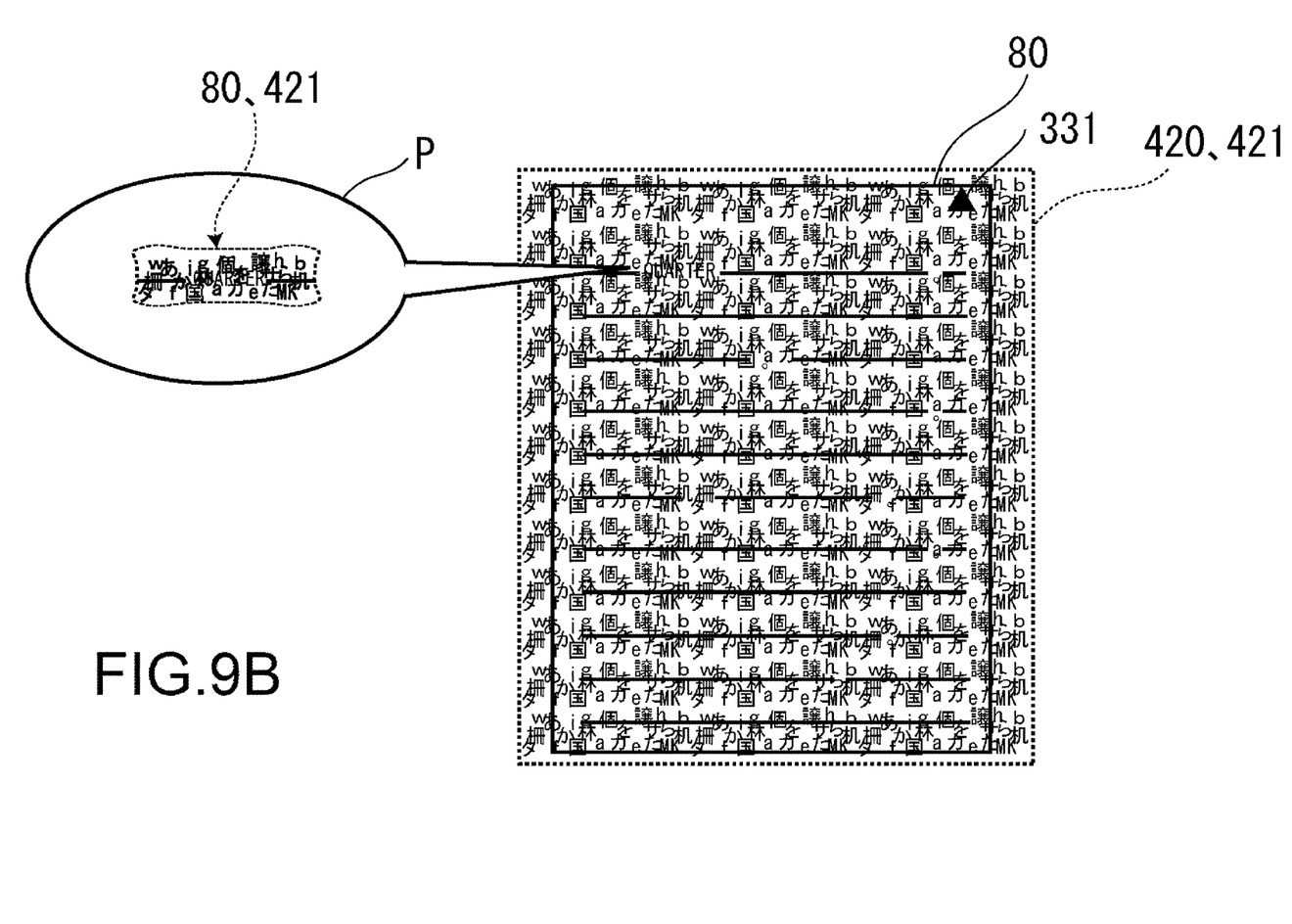
FIG. 9B is an image diagram illustrating a state in which a security image is projected on printed matter.

Moreover, as illustrated in FIG. 9A and FIG. 9B, the security image 421 may be an image on which plural identifiable characters (includes one or more of hiragana, katakana, kanji, alphabet, numbers and the like) are arranged at random. The projection-image-generating unit 452 generates a projection image 420 on which this security image 421 is arranged to fill the entire surface, and the image-projecting unit 43 project this projection image 420 toward the discharge tray 38. In doing so, when printed matter 80 for which double-sided printing is performed is outputted, the security image 421 overlaps the text (for example, "Quarter" in the enlarged view P in FIG. 9A) that is printed on the printed matter 80 as illustrated in FIG. 9A. As a result, as illustrated in FIG. 9B, the text that is printed on the printed matter 80 becomes lost in the characters that are densely arranged in the security image 421, and becomes difficult to identify. Therefore, even when other users that are passing by glance at the printed matter 80, it is not possible to read the confidential matter.

The projection-image-generating unit 452 may generate a projection image 420 in a state in which the size of the security image 421 is enlarged or reduced so that the size of the text inside the security image 421 becomes the same size as the size of text that is printed on the printed matter 80. In this way, when the security image 421 is projected it is possible to increase the difficulty in identifying the text that is written on the printed matter 80. It is also possible to configure the security image 421 by mixing beforehand, plural characters of various sizes large and small.

Moreover, configuration may also be such that it is possible to set the level of simple security on the simple-security-setting screen G50. In this case, the mark-adding unit 372 adds a different mark image 331 to the image data according to the level of simple security that is set. The projection-image-generating unit 452, corresponding to the detected mark image 331, can project a different security image 421 that differs for each level of simple security onto the printed matter 80 by the image-projecting unit 43. In the case of a low level of simple security, for example, the image-projecting unit 43 can project a projection image 420 on which the security image 421 that is illustrated in FIG. 7 is arranged. In the case of a medium level of simple security, for example, the image-projecting unit 43 can project a projection image 420 on which the security image 421 illustrated in FIG. 8A and FIG. 8B is arranged. In the case of a high level of simple security, for example, the image-projecting unit 43 can project a projection image 420 on which the security image 421 illustrated in FIG. 9A and FIG. 9B is arranged.

Figure 10A:
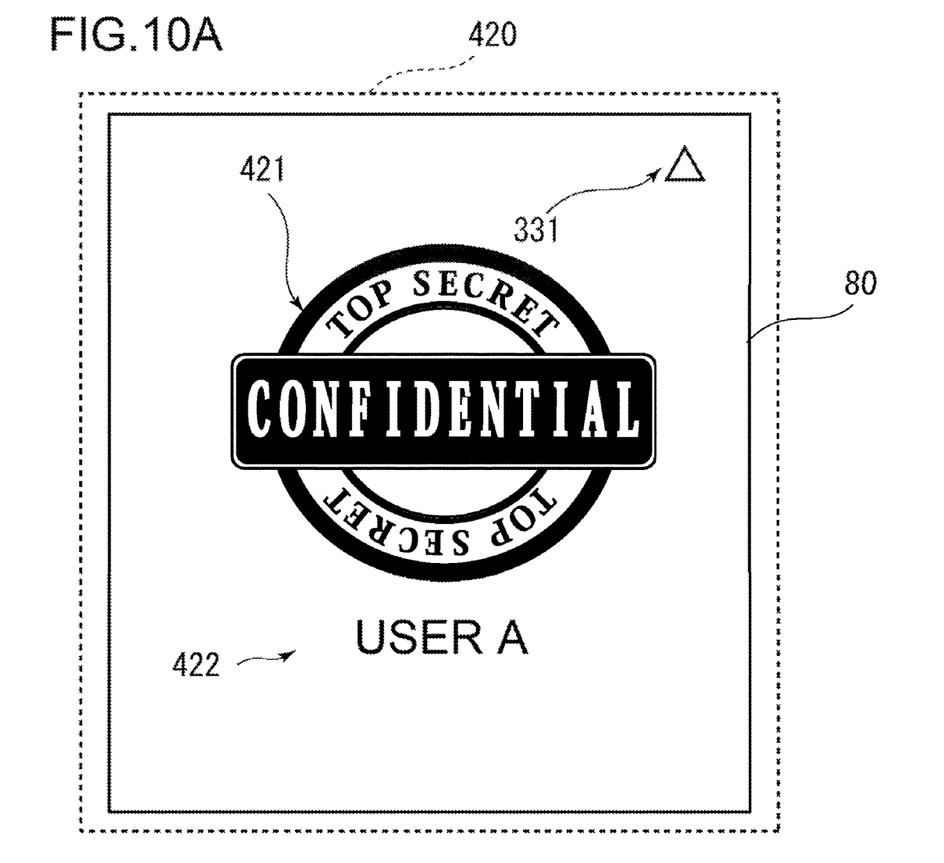
FIG. 10A is an image diagram illustrating a state in which a security image is projected on printed matter.

Moreover, as illustrated in FIG. 10A, when the mark-detecting unit 451 detects a mark image 331 that corresponds to a user, the projection-image-generating unit 452 generates a projection image 420, and the image-projecting unit 43 may project that projection image 420. On the projection image 420, together with the security image 421 for a user that corresponds to the mark image 331, a user name 422 that corresponds to the mark image 331 is arranged. As a result, by taking a look at the user name 422 it becomes clear who the printed matter 80 belongs to, so it is possible to prevent removal of the printed matter 80 by mistake, and thus it is possible to increase the security effect.

In this case, it is presumed that a user names that corresponds to the mark image 331 is stored in the storage unit 42 of the projector 4.

Figure 10B:
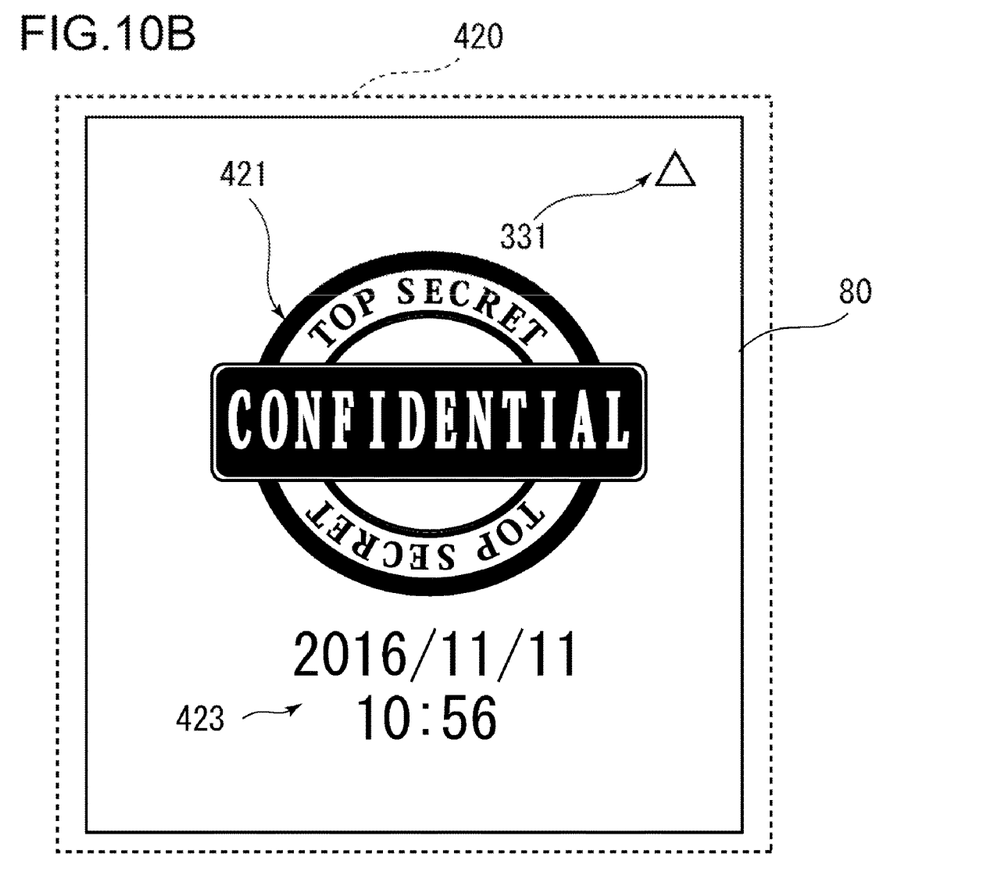
FIG. 10B is an image diagram illustrating a state in which a security image is projected on printed matter.

Furthermore, as illustrated in FIG. 10B, the projection-image-generating unit 452 generates a projection image 420 on which together with a security image 421 that corresponds to the mark image 331, the time at which the mark-detecting unit 451 detects the mark image 331 from the printed matter 80 is arranged as the printing time 423. Then, the projection image 420 may be projected on the printed matter 80 by the image-projecting unit 43. Printed matter 80 that is just printed may be hot to the touch due to heat that remains after fixing the toner. Accordingly, the printing time 423 is projected on the printed matter 80, so a user can take care when removing hot printed natter 80. Therefore, it is possible to prevent printed matter 80 from being seen by other users due to dropping and scattering hot printed matter 80. Needless to say, in addition to the user name 422, the printing time 423 may be arranged together with the security image 421, and one or more of the security images 421 above can be appropriately combined.

In this way, the image forming system 100 according to this embodiment is an image forming system 100 that includes an external apparatus 1, an image forming apparatus 3 and a projector 4. The external apparatus 1 gives an instruction to print image data. The image forming apparatus 3 has a printing unit 35 that prints based on image data for which there is a printing instruction given by the external apparatus 1. The external apparatus 1 includes a simple-security-setting-receiving unit 142, and a printing-instruction-transmitting unit 143. The simple-security-setting-receiving unit 142 receives a simple-security setting for image data for which there is a printing instruction. The printing-instruction-transmitting unit 143 includes the simple-security setting that is received by the simple-security-setting unit 142 in the printing instruction, and transmits the printing instruction to the image forming apparatus 3. This image forming apparatus 3 includes a simple-security-determining unit 371, a mark-adding unit 372 and a discharge tray 38. The simple-security-determining unit 371 determines whether or not a simple-security setting is included in the printing instruction that is transmitted by the printing-instruction-transmitting unit 143. When a simple-security setting is included, the mark-adding unit 372 adds a mark image 331 to the image data for which there is a printing instruction. Printed matter 80 that is printed by the printing unit 35 is discharged to the discharge tray 38 with the surface on which the mark image 331 is printed facing upward. Moreover, the projector 4 includes an imaging unit 41, a mark-detecting unit 451, a projection-image-generating unit 452 and an image-projecting unit 43. The imaging unit 41 captures an image of printed matter 80 that is discharged to the discharge tray 38. The mark-detecting unit 451 detects a mark image 331 from the captured image that is captured by the imaging unit 41. When a mark image 331 is detected by the mark-detecting unit 451, the projection-image-generating unit 452 generates a projection image 420 on which a specified security image 421 is arranged. The image-projecting unit 43 projects the projection image 420 that is generated by the projection-image-generating unit 452 toward the discharge tray 38.

As a result, by the user performing just a simple-security setting when giving an instruction from the external apparatus 1 to print image data, the projector 4 projects a projection image on which a security image 421 is arranged onto printed matter 80 that is outputted from the image forming apparatus 3. Therefore, it is possible to prevent the printed matter 80 from being viewed by other users, and thus it is possible to securely protect the printed matter 80. Moreover, a simple-security setting is included in the printing instruction, so the user does not have to wait for the output of the printed matter 80 in front of the image forming apparatus 3.

In typical technology, even in the case of outputting printed matter that is not so important, but that the user does not wish others to view, there is a problem in that it is necessary to perform a troublesome authentication operation such as key authentication before outputting all.

According to the present disclosure, it is possible to simply and securely protect printed matter that is not so important, but that the user does not wish others to view.

The present disclosure is not limited to the embodiments described above, and needless to say, various modifications are possible within a range that does not depart from the scope of the present disclosure.

What is claimed is:

1. An image forming system, comprising an external apparatus that gives a printing instruction for printing image data, an image forming apparatus that has a printing unit that prints based on the image data for which there is the printing instruction by the external apparatus, and a projector; wherein the external apparatus comprises:
a simple-security-setting-receiving unit that receives a simple-security setting for the image data for which there is the printing instruction; and
a printing-instruction-transmitting unit that includes the simple-security setting that is received by the simple-security-setting-receiving unit in the printing instruction, and transmits the printing instruction to the image forming apparatus;

the image forming apparatus comprises:
a simple-security-determining unit that determines whether or not the simple-security setting is included in the printing instruction that is transmitted by the printing-instruction-transmitting unit;
a mark-adding unit that, when the simple-security setting is included, adds a mark image to the image data for which there is the printing instruction; and
a discharge tray to which printed matter that is printed by the printing unit is discharged with the surface on which the mark image is printed facing upward; and the projector comprises:
an imaging unit that captures an image of printed matter that is discharged to the discharge tray;
a mark-detecting unit that detects the mark image from the captured image that is captured by the imaging unit;
a projection-image-generating unit that, when the mark image is detected by the mark-detecting unit, generates a projection image on which a specified security image is arranged; and
an image-projecting unit that projects the projection image that is generated by the projection-image-generating unit toward the discharge tray.

2. The image forming system according to claim 1, wherein
the mark-adding unit of the image forming apparatus adds the mark image that is correlated to the user that gave the printing instruction to the image data; and
projection-image-generating unit of the projector generates the projection image on which the security image that corresponds to the mark image of the user that gave the printing instruction is arranged.

3. The image forming system according to claim 1, wherein
the simple-security-setting-receiving unit of the external apparatus
sets a level of simple security in the image data for which there is a printing instruction;
the mark-adding unit of the image forming apparatus
adds the mark image that corresponds to the level of the simple security to the image data; and
the projection-image-generating unit of the projector
generates the projection image on which the security image that corresponds to the mark image that corresponds to the level of the simple security is arranged.

4. The image forming system according to claim 1, wherein
the projection-image-generating unit of the projector
generates the projection image on which a user name that corresponds to the mark image that is detected from the captured image by the mark-detecting unit is arranged together with the security image.

5. The image forming system according to claim 1, wherein
the projection-image-generating unit of the projector
generates the projection image on which the time that the mark image is detected from the captured image by the mark-detecting unit is arranged together with the security image.

6. The image forming system according to claim 1, wherein
the security image is an image having the same color as a specified color in which confidential matter is written.

7. The image forming system according to claim 1, wherein
the security image is an image on which plural characters are arranged at random.

* * * * *